F. HALCIN.
AIRSHIP.
APPLICATION FILED JULY 23, 1914.

1,128,603.

Patented Feb. 16, 1915.
2 SHEETS—SHEET 1.

Witnesses

Inventor
F. Halcin
By
Attorney

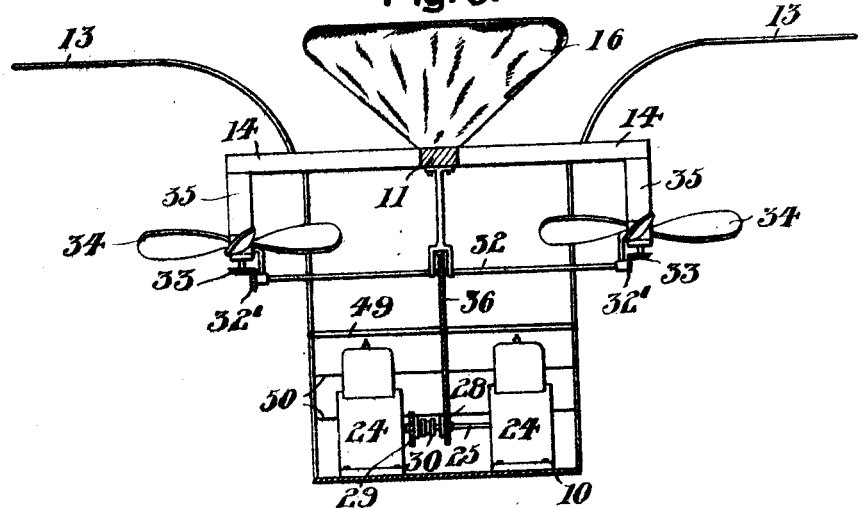

UNITED STATES PATENT OFFICE.

FLORIAN HALCIN, OF CONWAY, NORTH DAKOTA.

AIRSHIP.

1,128,603.

Specification of Letters Patent.

Patented Feb. 16, 1915.

Application filed July 23, 1914. Serial No. 852,665.

*To all whom it may concern:*

Be it known that I, FLORIAN HALCIN, a subject of the Emperor of Austria-Hungary, residing at Conway, in the county of Walsh and State of North Dakota, have invented certain new and useful Improvements in Airships, of which the following is a specification.

This invention relates to certain new and useful improvements in airships.

The primary object of this invention is to provide a device for aerial navigation provided with a separate set of elevating and forwardly propelling motor-driven means. A further object is to provide a motor-driven airship with stationary side and forward sustaining planes and with a rear universal pivoted steering plane.

A still further object is to provide a passenger carrying frame with a sustaining plane at each of the four sides thereof, and the rearward one being a steering plane, and the device provided with motor-driven side elevating planes and a rear forwardly propelling plane, the side and rear planes being only operable at different times.

With these general objects in view and others that will appear as the nature of the invention is better understood, the same consists in the novel construction, combination and arrangement of parts hereinafter more fully described and then claimed.

In the accompanying drawings forming a part of this application and whereby like numerals of reference designate corresponding parts throughout the different views:—

Figure 1:
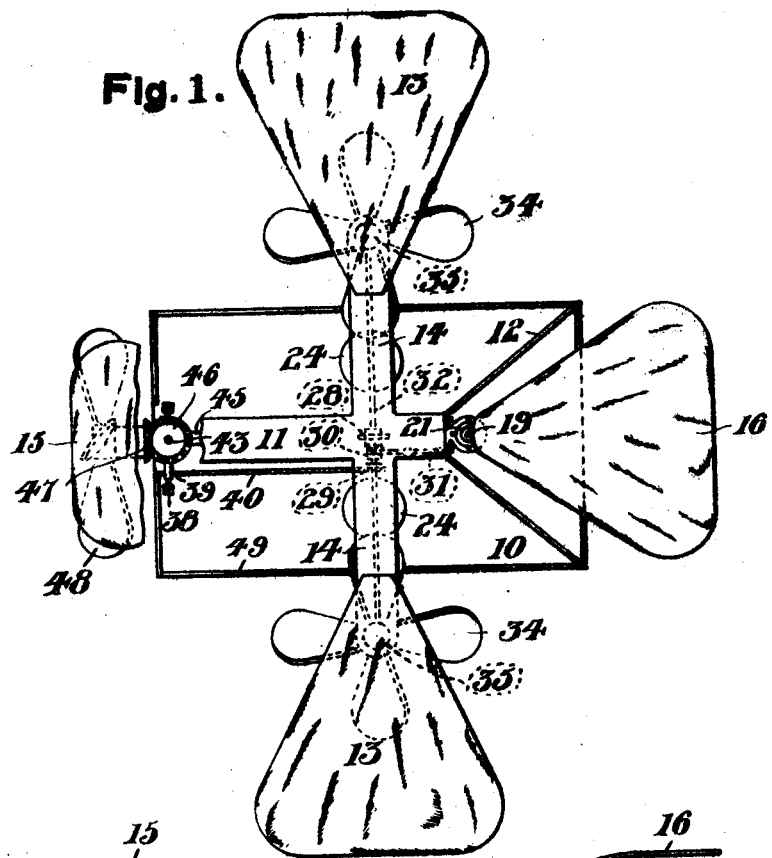
Figure 2:
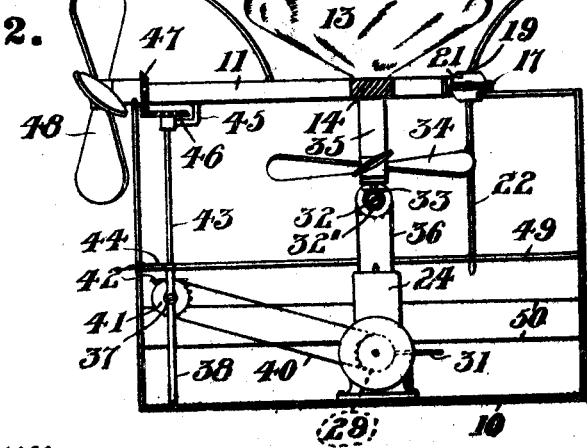

Figure 1 is a top plan view of the device with a rear plane and support partially broken away. Fig. 2 is a vertical longitudinal sectional view of the device. Fig. 3 is a vertical transverse sectional view thereof. Fig. 4 is a horizontal sectional view thereof. Fig. 5 is a detailed enlarged view partially in section, of the clutch and the gear connections. Fig. 6 is an enlarged sectional view of the universal pivot for the rear steering plane, and, Fig. 7 is a top plan view of said pivot with the supporting rods broken away.

Referring more in detail to the drawings, the device broadly consists in the provision of a platform or car 10 supported by a cross-shaped frame-work 11 by means of corner connecting rods 12. Oppositely-positioned side planes 13 are rigidly secured to the opposite ends of the side arms 14 of the frame, and said planes are of substantially triangular shape extending upwardly and outwardly, and are preferably formed of fabric upon a metallic frame-work, the entire planes being slightly resilient and flexible.

A forward plane 15 of substantially identical construction to the side planes is mounted upon the frame 11 and projects forwardly thereof. It being noted that the said single forward and two side planes have a rigid connection with the frame-work, a rear plane 16 substantially identical in form is pivoted to the rear end of said frame by means of the universal swivel joint 17. This joint consists of the ball 18 having the rear plane 16 secured to the top thereof by the rod 19, which rod freely projects through an enlarged circular opening 20 in the top cap 21 of the joint. A steering lever 22 is secured to the bottom of the ball 18 and projects through the bottom opening 23 of the joint and extends downwardly to a point adapted to be grasped by the operator of the airship in directing the course of the same by shifting the rear plane 16.

A plurality of motors 24 are mounted upon the platform 10 and are provided with a single driving shaft 25, to which shaft spaced clutch members 26 and 27 are rigidly secured, said members being supplied with gear wheels 28 and 29 respectively. A shiftable double faced clutch member 30 is splined upon the shaft 25 and is provided with opposite faces adapted to engage the adjacent clutch members 26 and 27 upon the sliding movement of the member 30 as influenced by the shifting lever 31.

A transversely-journaled shaft 32 is carried by the frame 11 and has its opposite ends provided with pinions 32' in constant mesh with pinions 33, which latter are carried by the opposite side propellers 34 which are mounted upon depending side arms 35 of the said frame 11. The shaft 32 is operatively-connected to the gear 28 by the sprocket chain 36, by which construction, it will be evident that upon shifting the clutch member 30 into engagement with the clutch member 26, the revolution of the shaft 25 will be transmitted to the driven shaft 32, thereby operating the elevating propellers 34.

A stub shaft 37 is journaled in uprights 38 carried by the car floor 10 and has a sprocket 39 thereon operatively connected to the sprocket wheel 29 by means of the sprocket chain 40. A gear 41 is also secured to the stub shaft 37 and is in constant mesh with a pinion 42 carried by the vertically-positioned driven shaft 43, which latter is journaled in a side bracket 44 and a top bracket 45. A gear 46 is secured to the top of the shaft 43 and is in mesh with a similar gear 47 of the forward propeller 48. By this arrangement, it will be seen that upon clutching up the sprocket 29 with the clutch member 30 by means of the lever 31, that power will be transmitted to the stub shaft 37 and thence to the driven shaft 43, whereby the forwardly propelling blade 48 will be revolved.

A side railing 49 and wires 50 completely surround the car above the platform or floor 10 thereof and complete a form of cage structure.

The complete operation of the device will be apparent from the present detailed description in that, by operating the clutch lever 31, the motive power may be supplied to the two side propellers 34 which are alone serviceable in elevating the ship, while upon reversing the position of the clutch lever, the side propellers are disconnected and the forward propeller 48 actively revolved which effects a forward movement of the device. The side and forward planes assist to sustain the craft in the air while the rear plane 16 shiftable in any desired direction by means of the lever 22 serves to accurately direct its course of travel.

While the forms of the invention herein shown and described are what are believed to be preferable embodiments thereof, it is nevertheless to be understood that various forms, modifications and arrangements of the parts may be made without departing from the spirit and scope of the invention as claimed.

What I claim as new is:—

1. A device of the class described, comprising a car, flexible outwardly flaring side and forward planes rigidly secured thereto, a similar rearwardly-projecting plane, a universal ball and socket swivel connection secured to said frame, and operatively attached to said rear plane, and a downwardly-projecting steering lever for said rear plane swivel.

2. A device of the class described, comprising a car, flexible outwardly flaring side and forward planes rigidly secured thereto, a similar rearwardly-projecting plane, a universal ball and socket swivel connection secured to said frame, and operatively attached to said rear plane, a downwardly-projecting steering lever for said rear plane swivel, side propellers and a forward propeller upon said car, a motor within said car, separate connections between said motor and said forward and side propellers, and clutch mechanism for said motor whereby either said single front or said two side propellers are at different times positioned within the operative motor connections.

In testimony whereof I affix my signature in presence of two witnesses.

FLORIAN HALCIN.

Witnesses:
 ADOLF PYTLIK.
 CHAS. E. VAN ARSDALE.